(12) United States Patent
Zaidi et al.

(10) Patent No.: US 12,229,565 B2
(45) Date of Patent: Feb. 18, 2025

(54) IN-CORE PARALLELIZATION IN A DATA PROCESSING APPARATUS AND METHOD

(71) Applicant: ARM LIMITED, Cambridge (GB)

(72) Inventors: Syed Ali Mustafa Zaidi, Cambridge (GB); Giacomo Gabrielli, Cambridge (GB)

(73) Assignee: Arm Limited, Cambridge (GB)

( * ) Notice: Subject to any disclaimer, the term of this patent is extended or adjusted under 35 U.S.C. 154(b) by 28 days.

(21) Appl. No.: 18/042,845

(22) PCT Filed: Aug. 26, 2021

(86) PCT No.: PCT/GB2021/052211
§ 371 (c)(1),
(2) Date: Feb. 24, 2023

(87) PCT Pub. No.: WO2022/049367
PCT Pub. Date: Mar. 10, 2022

(65) Prior Publication Data
US 2023/0325194 A1  Oct. 12, 2023

(30) Foreign Application Priority Data

Sep. 1, 2020 (GB) ..................................... 2013702
Sep. 2, 2020 (GB) ..................................... 2013770

(51) Int. Cl.
*G06F 9/38* (2018.01)
*G06F 9/30* (2018.01)
*G06F 9/48* (2006.01)

(52) U.S. Cl.
CPC .......... *G06F 9/3851* (2013.01); *G06F 9/3016* (2013.01); *G06F 9/4843* (2013.01)

(58) Field of Classification Search
None
See application file for complete search history.

(56) References Cited

U.S. PATENT DOCUMENTS

| | | | |
|---|---|---|---|
| 6,256,775 B1 * | 7/2001 | Flynn | G06F 11/3466 718/107 |
| 6,401,155 B1 * | 6/2002 | Saville | G06F 9/462 710/266 |

(Continued)

FOREIGN PATENT DOCUMENTS

CA     2680597 C  *  6/2011  ............. G06F 8/443

OTHER PUBLICATIONS

'Helper Threads via Virtual Multithreading on an Experimental Itanium 2 Processor-based Platform' by Wang et al., 2004. (Year: 2004).*

(Continued)

*Primary Examiner* — Steven G Snyder
(74) *Attorney, Agent, or Firm* — NIXON & VANDERHYE P.C.

(57) ABSTRACT

A data processing apparatus and a method for processing data are disclosed. The data processing apparatus comprises: multithreaded processing circuitry to perform processing operations of a plurality of micro-threads, each micro-thread operating in a corresponding execution context defining an architectural state. Thread control circuitry collects runtime data indicative of a performance metric relating to the processing operations. Decoder circuitry is responsive to a detach instruction in a first micro-thread of instructions executed in a first execution context defining a first architectural state, the detach instruction specifying an address, to provide detach control signals to the thread control circuitry. When the runtime data meet a parallelization criterion, the thread control circuitry is responsive to the detach control signals to spawn a second micro-thread of instructions executed in a second execution context defining a second architectural state based on the first architectural state, the second micro-thread of instructions comprising a subset of (Continued)

Figure 1:
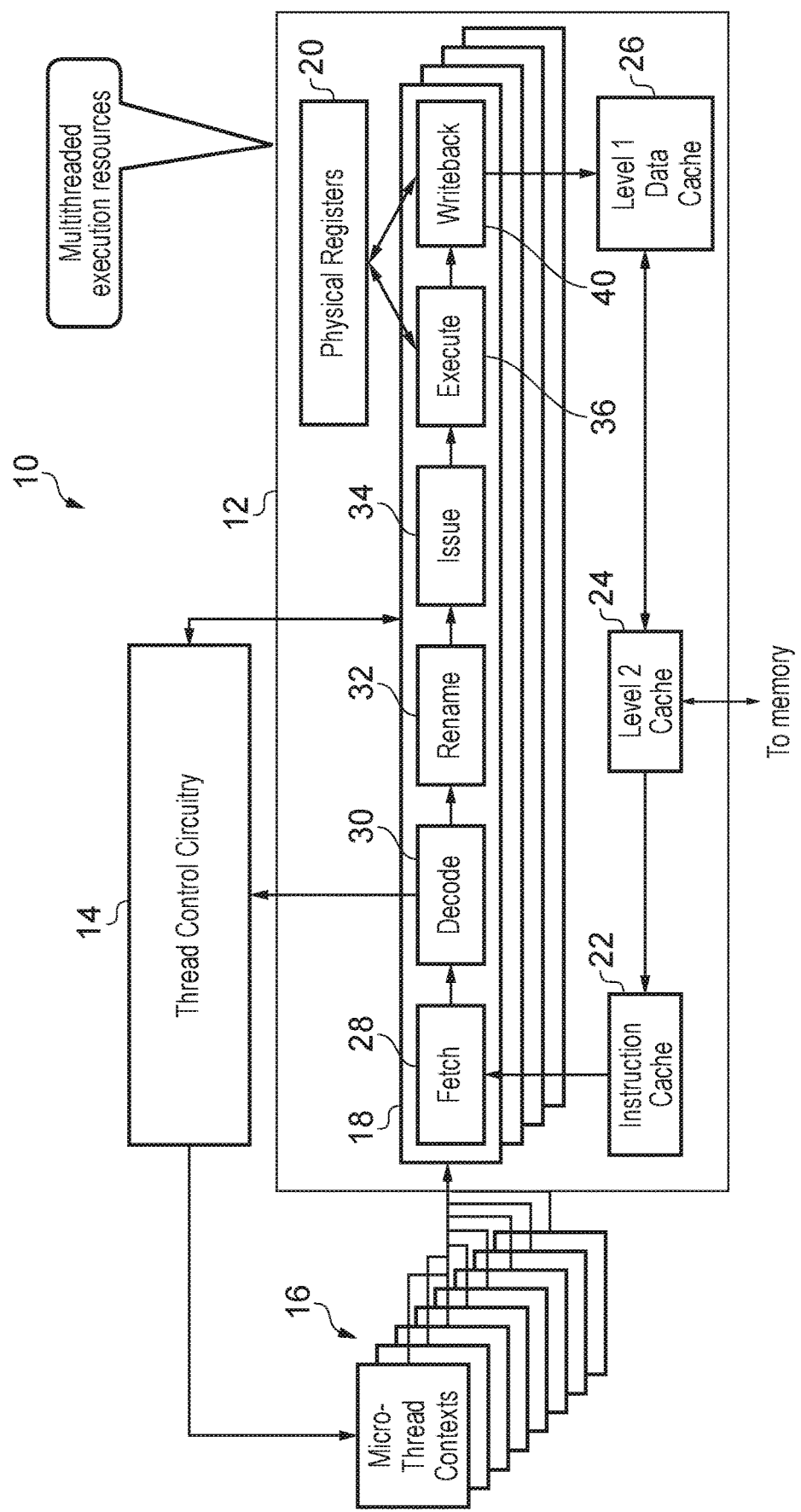

instructions of the first micro-thread of instructions starting at the address.

20 Claims, 10 Drawing Sheets

(56) References Cited

U.S. PATENT DOCUMENTS

| | | | | |
|---|---|---|---|---|
| 7,587,584 | B2* | 9/2009 | Enright | G06F 9/4843 |
| | | | | 712/228 |
| 7,631,307 | B2* | 12/2009 | Wang | G06F 9/3009 |
| | | | | 712/228 |
| 7,650,485 | B1 | 1/2010 | Chou | |
| 7,941,646 | B2* | 5/2011 | Holloway | G06F 9/3851 |
| | | | | 712/220 |
| 8,667,253 | B2* | 3/2014 | Frazier | G06F 9/3851 |
| | | | | 712/31 |
| 9,910,796 | B2* | 3/2018 | Wang | G06F 9/3005 |
| 10,459,858 | B2* | 10/2019 | Wang | G06F 9/3851 |
| 10,877,910 | B2* | 12/2020 | Wang | G06F 11/348 |
| 2004/0163083 | A1 | 8/2004 | Wang et al. | |
| 2005/0050395 | A1* | 3/2005 | Kissell | G06F 9/3009 |
| | | | | 712/E9.032 |
| 2005/0125802 | A1* | 6/2005 | Wang | G06F 9/3009 |
| | | | | 712/E9.032 |
| 2005/0144602 | A1* | 6/2005 | Ngai | G06F 8/41 |
| | | | | 717/151 |
| 2005/0149697 | A1* | 7/2005 | Enright | G06F 9/3009 |
| | | | | 712/228 |
| 2005/0149931 | A1* | 7/2005 | Lin | G06F 9/3851 |
| | | | | 718/100 |
| 2005/0160254 | A1* | 7/2005 | Lin | G06F 9/3851 |
| | | | | 712/228 |
| 2005/0188189 | A1 | 8/2005 | Yeung et al. | |
| 2007/0113055 | A1* | 5/2007 | Dale | G06F 9/3863 |
| | | | | 712/228 |
| 2009/0172361 | A1* | 7/2009 | Holloway | G06F 9/3851 |
| | | | | 712/E9.016 |
| 2012/0036339 | A1* | 2/2012 | Frazier | G06F 9/30101 |
| | | | | 712/E9.016 |
| 2013/0219096 | A1* | 8/2013 | Wang | G06F 13/24 |
| | | | | 710/267 |
| 2017/0132011 | A1* | 5/2017 | Caulfield | G06F 9/30072 |
| 2017/0206083 | A1* | 7/2017 | Wang | G06F 9/4843 |
| 2018/0060258 | A1* | 3/2018 | Wang | G06F 9/3851 |
| 2018/0276046 | A1 | 9/2018 | Joao et al. | |

OTHER PUBLICATIONS

Hong Wang et al., "Speculative precomputation: exploring the use of multithreading for latency", Intel Technology Journal, XX, US, No. 1, Feb. 14, 2002 (Feb. 14, 2002), pp. 1-14, XP002303432. whole document.

Tao B. Schardl, et al., "Tapir: Embedding Fork-Join Parallelism into LLVM's Intermediate Representation", MIT Computer Science and Artificial Intelligence Laboratory, 32 Vassar Street, Cambridge, MA 02139; Feb. 4-8, 2017.

Paraskevas Yiapanis, et al., "Compiler-Driven Software Speculation for Thread-Level Parallelism", University of Manchester, Dec. 2015.

Alvaro Estebanez, et al., "A Survey on Thread-Level Speculation Techniques", Universidad de Valladolid, ACM Computing Surveys, vol. 49, No. 2, Article 22, Publication date: Jun. 2016.

Simone Campanoni, et al., "HELIX-RC: An Architecture-Compiler Co-Design for Automatic Parallelization of Irregular Programs",c 2014 IEEE.

J. Gregory Steffan, "Hardware Support for Thread-Level Speculation", CMU-CS-03-122, Apr. 2003.

J. Gregory Steffan, et al., "The STAMPede Approach to Thread-Level Speculation", ACM Transactions on Computer Systems, vol. 23, No. 3, Aug. 2005, pp. 253-300.

Taku Ohsawa, et al., "Pinot: Speculative Multi-threading Processor Architecture Exploiting Parallelism over a Wide Range of Granularities", NEC Corporation, 2005.

"MIPS® MT Principles of Operation" Document No. MD00452, Revision 1.02, Sep. 9, 2013.

* cited by examiner

IN-CORE PARALLELIZATION IN A DATA PROCESSING APPARATUS AND METHOD

This disclosure relates to in-core parallelization of code in a data processing apparatus.

The parallelization of sequential instructions provides a means to improve scaling of sequential performance within a data processing apparatus. Typical out-of-order execution used in modern general purpose CPU processors relies on fine-grain instruction-level parallelism to convert a sequential instruction stream into a restricted dataflow execution model. However, performance gains are restricted within the constraints of the instruction window size of the out-of-order processor. This mechanism is unable to identify and make use of opportunities for coarse-grain task level parallelism within a sequential instruction scheme. Task level parallelism can improve the performance of sequential code. However, task level parallelism typically requires programmer intervention to re-write code, based on extensive profiling of runtime performance of code, to explicitly expose opportunities for parallelization. Alternatively, if compiler support exists, code making use of task level parallelization can incur significant overheads compared to optimized sequential code, thereby requiring two different code versions, one for use when task level parallelization is supported and another for sequential execution. For these reasons typical approaches to task level parallelization that rely on conventional multi-core processors with heavy reliance on software tend to exhibit poor performance scaling and poor efficiency.

At least one embodiment of the present disclosure provides a data processing apparatus comprising: multithreaded processing circuitry to perform processing operations of a plurality of micro-threads, each micro-thread operating in a corresponding execution context defining an architectural state; thread control circuitry to collect runtime data indicative of a performance metric relating to the processing operations; and decoder circuitry responsive to a detach instruction in a first micro-thread of instructions executed in a first execution context defining a first architectural state, the detach instruction specifying an address, to provide detach control signals to the thread control circuitry, wherein when the runtime data meet a parallelization criterion, the thread control circuitry is responsive to the detach control signals to spawn a second micro-thread of instructions executed in a second execution context defining a second architectural state based on the first architectural state, the second micro-thread of instructions comprising a subset of instructions of the first micro-thread of instructions starting at the address.

At least one embodiment of the present disclosure provides a data processing method comprising: collecting runtime data indicative of a performance metric relating to processing operations of a plurality of micro-threads in a corresponding execution context defining an architectural state on multithreaded processing circuitry; generating detach control signals in response to a detach instruction in a first micro-thread of instructions executed in a first execution context defining a first architectural state, the detach instruction specifying an address; and spawning, in response to the detach control signals and when the runtime data meet a parallelization criterion, a second micro-thread of instructions executed in a second execution context defining a second architectural state based on the first architectural state, the second micro-thread of instructions comprising a subset of instructions of the first micro-thread of instructions starting at the address.

At least one embodiment of the present disclosure provides a data processing apparatus comprising: means for collecting runtime data indicative of a performance metric relating to processing operations of a plurality of micro-threads in a corresponding execution context defining an architectural state on multithreaded processing circuitry; means for generating detach control signals in response to a detach instruction in a first micro-thread of instructions executed in a first execution context defining a first architectural state, the detach instruction specifying an address; and means for spawning, in response to the detach control signals and when the runtime data meet a parallelization criterion, a second micro-thread of instructions executed in a second execution context defining a second architectural state based on the first architectural state, the second micro-thread of instructions comprising a subset of instructions of the first micro-thread of instructions starting at the address.

Figure 2:
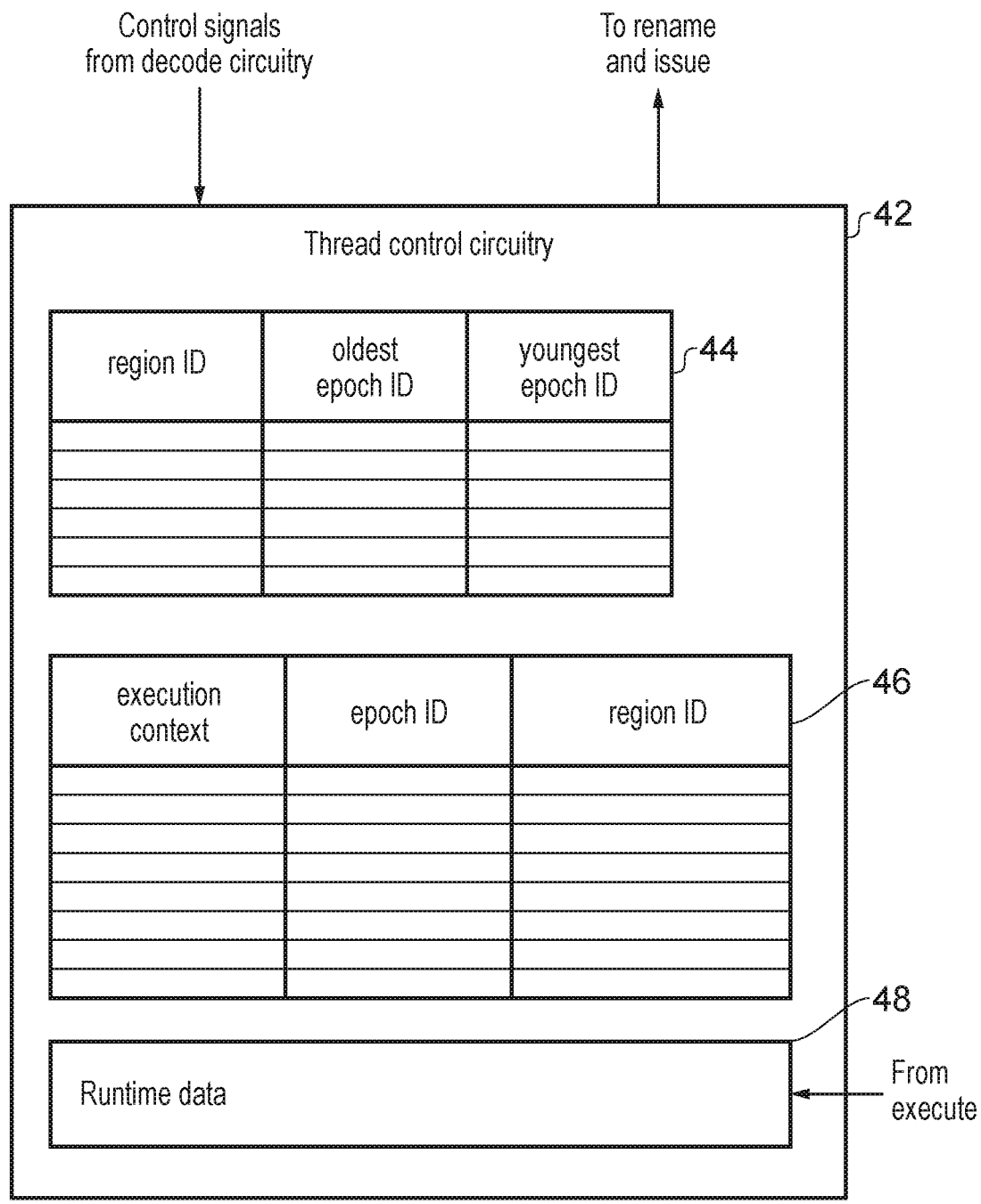
Figure 3A:
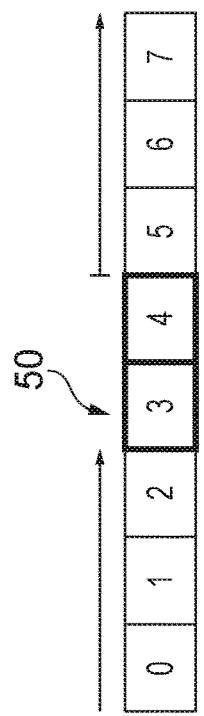
Figure 3B:
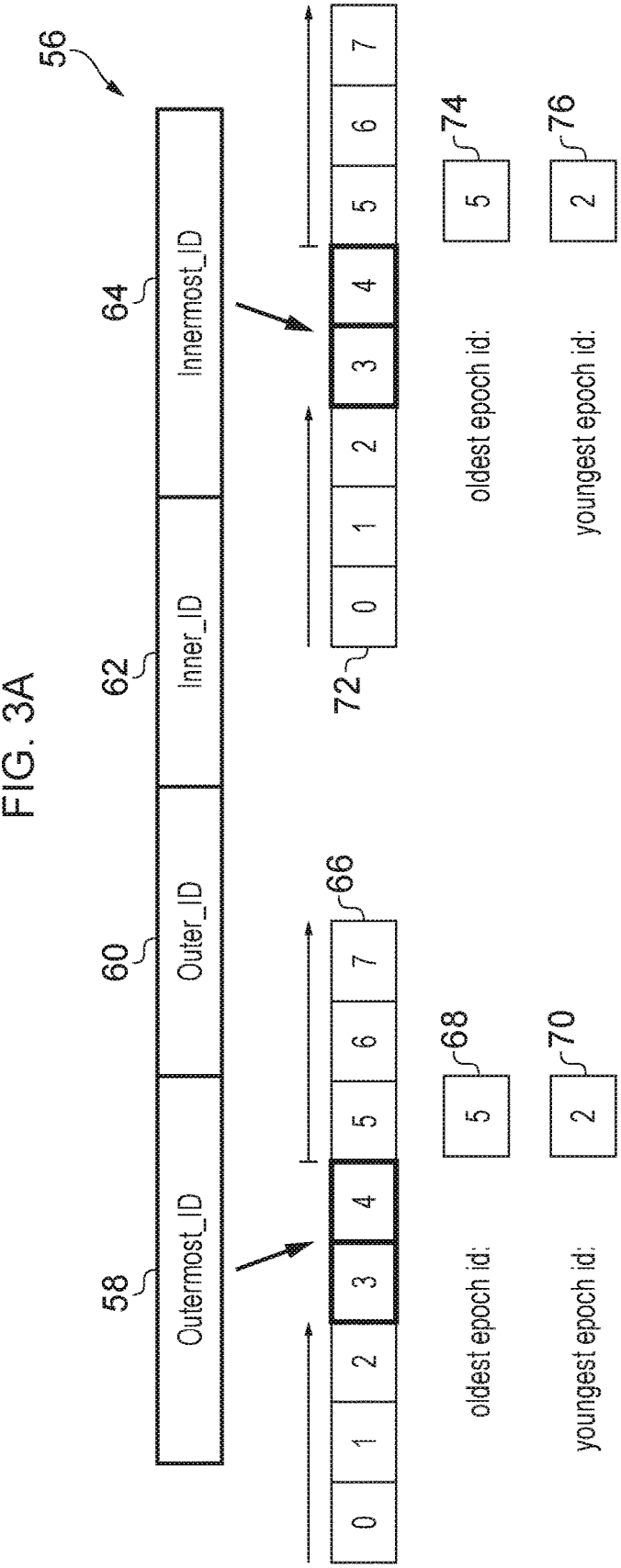
Figure 4:
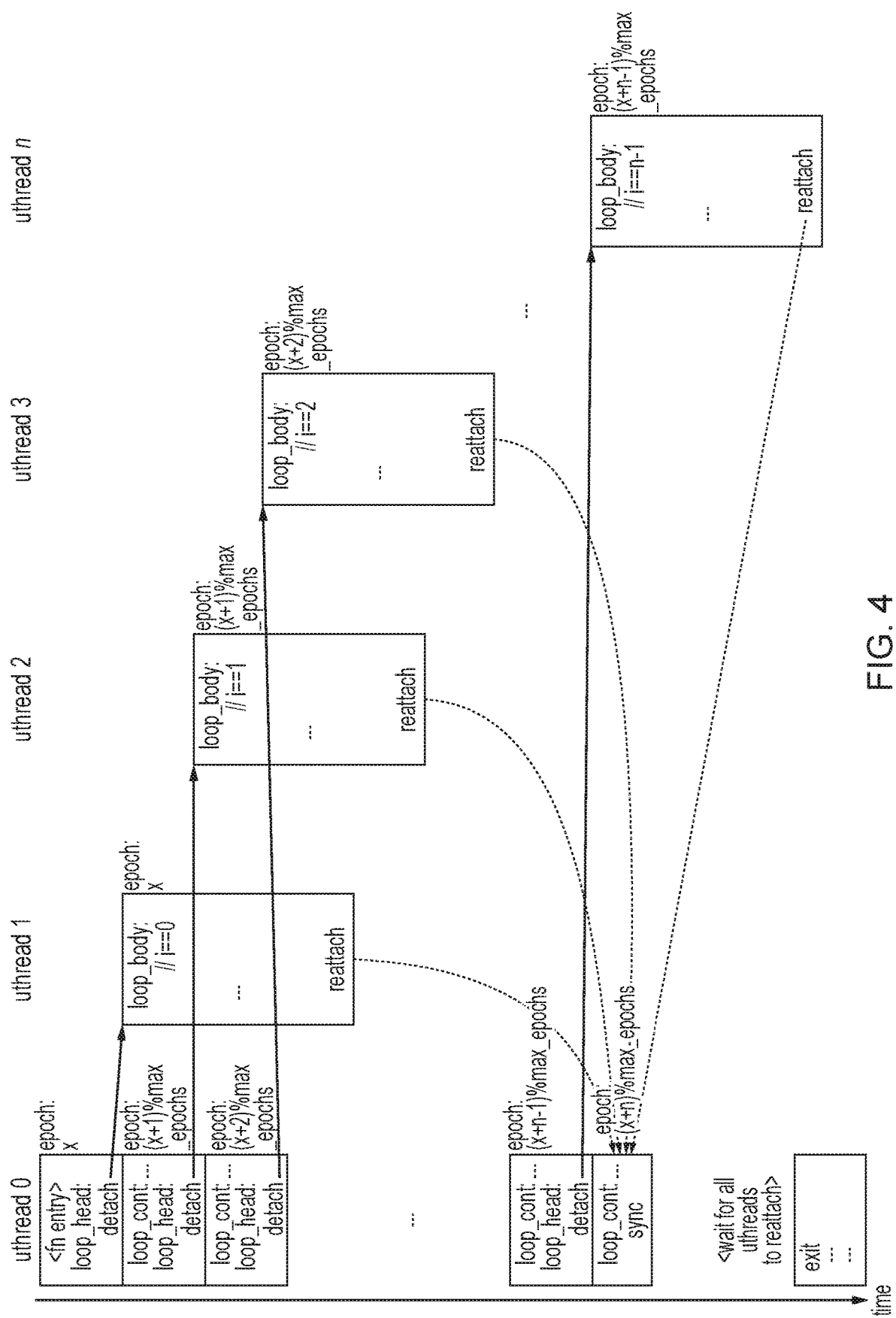
Figure 5:
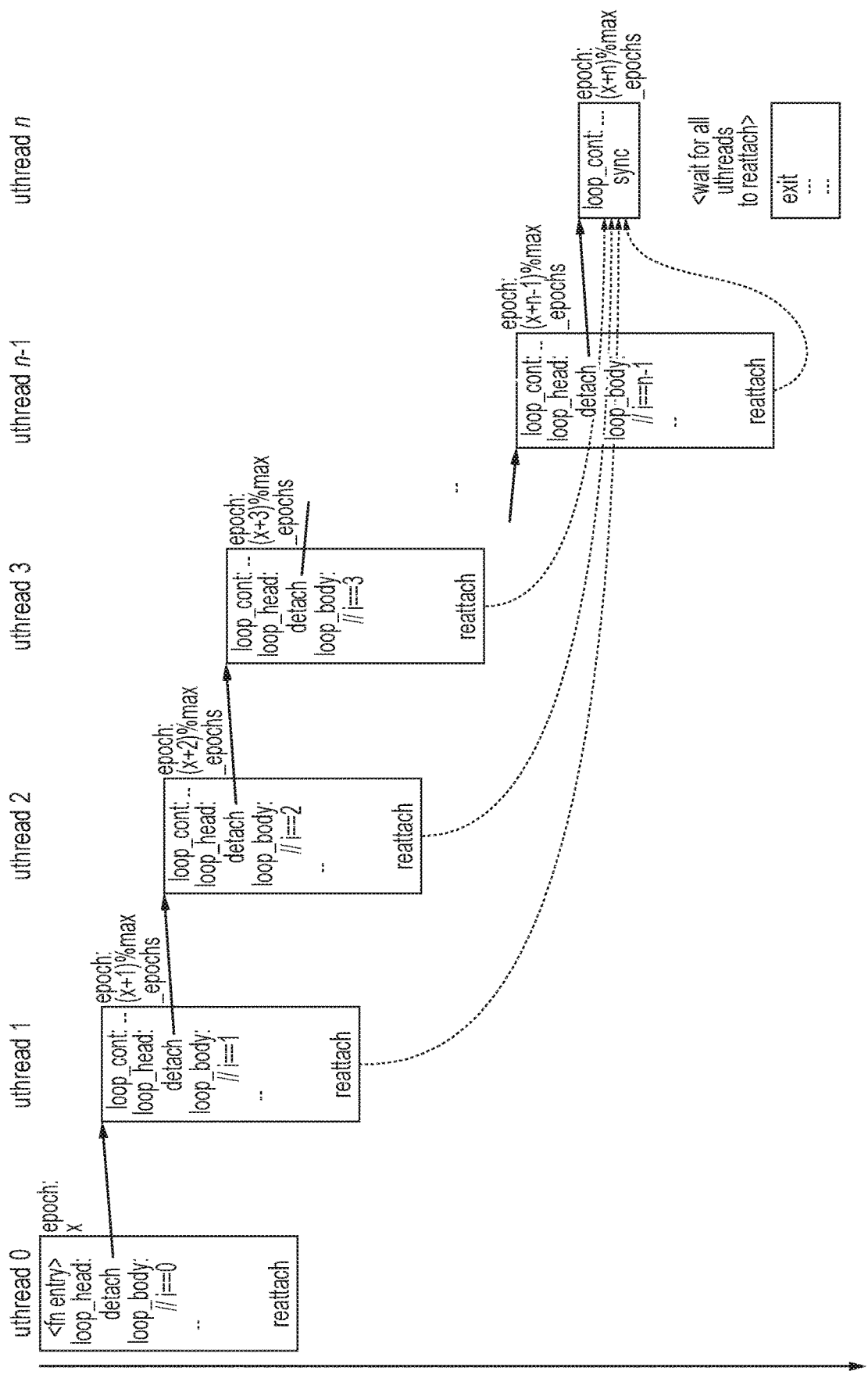
Figure 6:
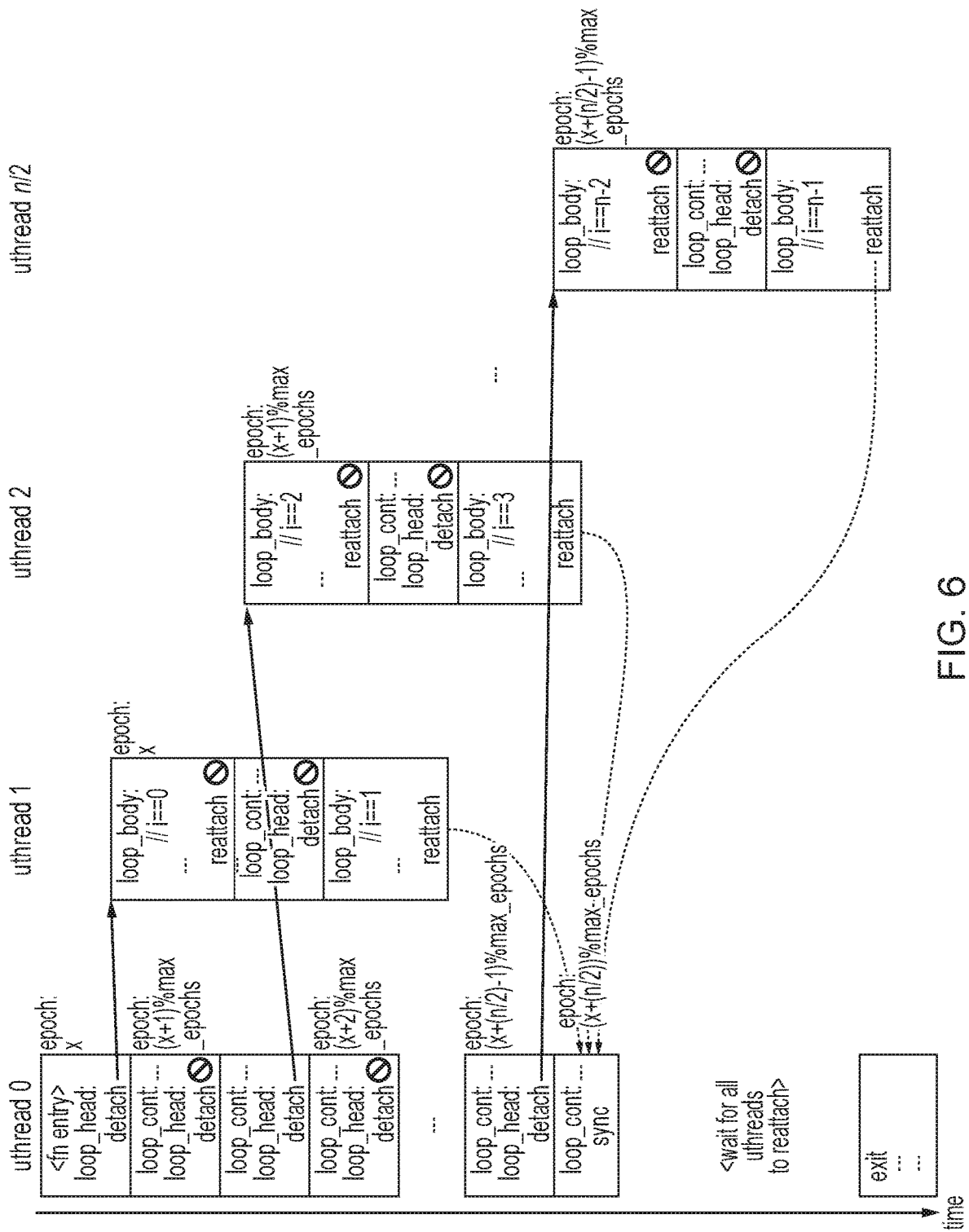
Figure 7:
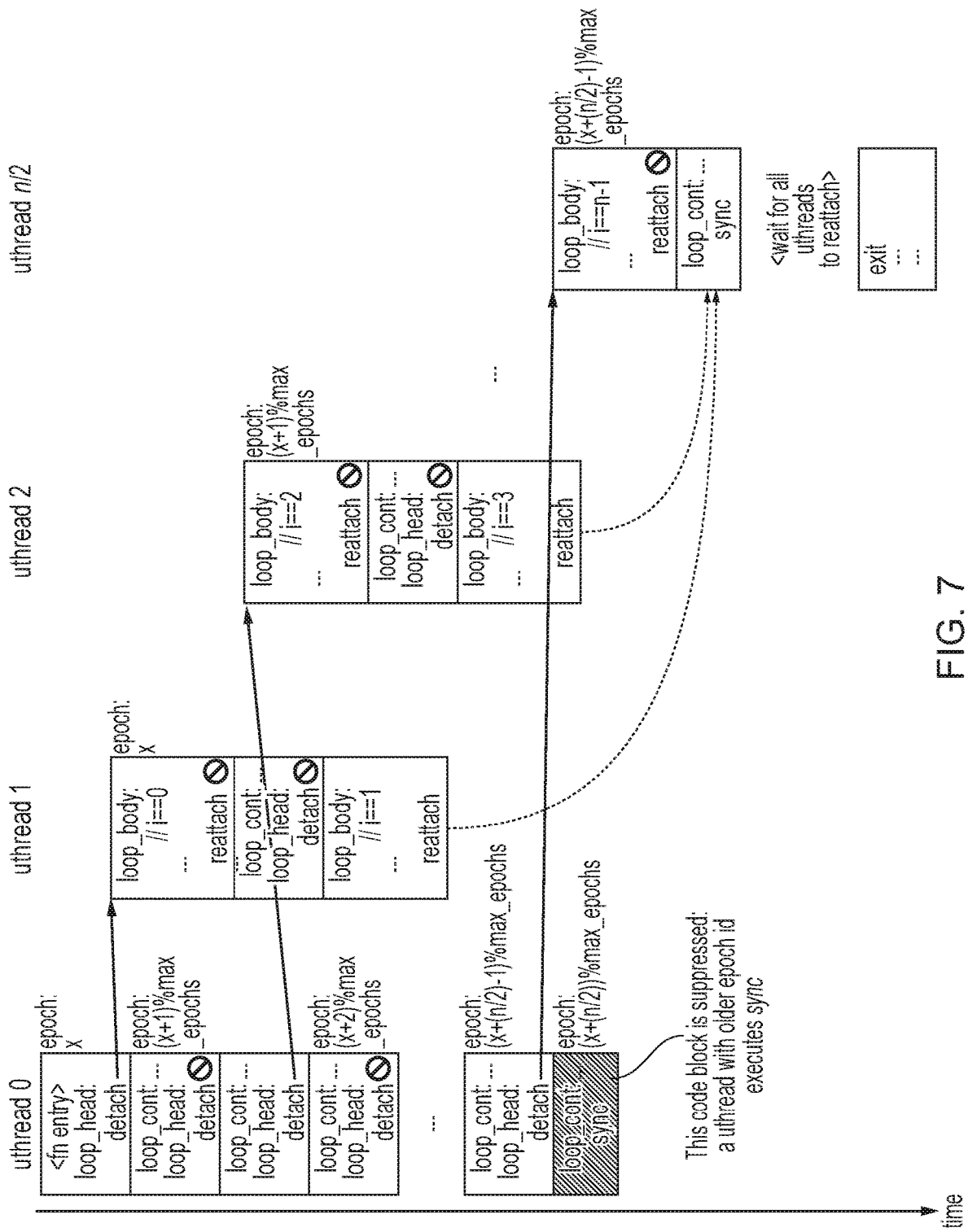
Figure 8:
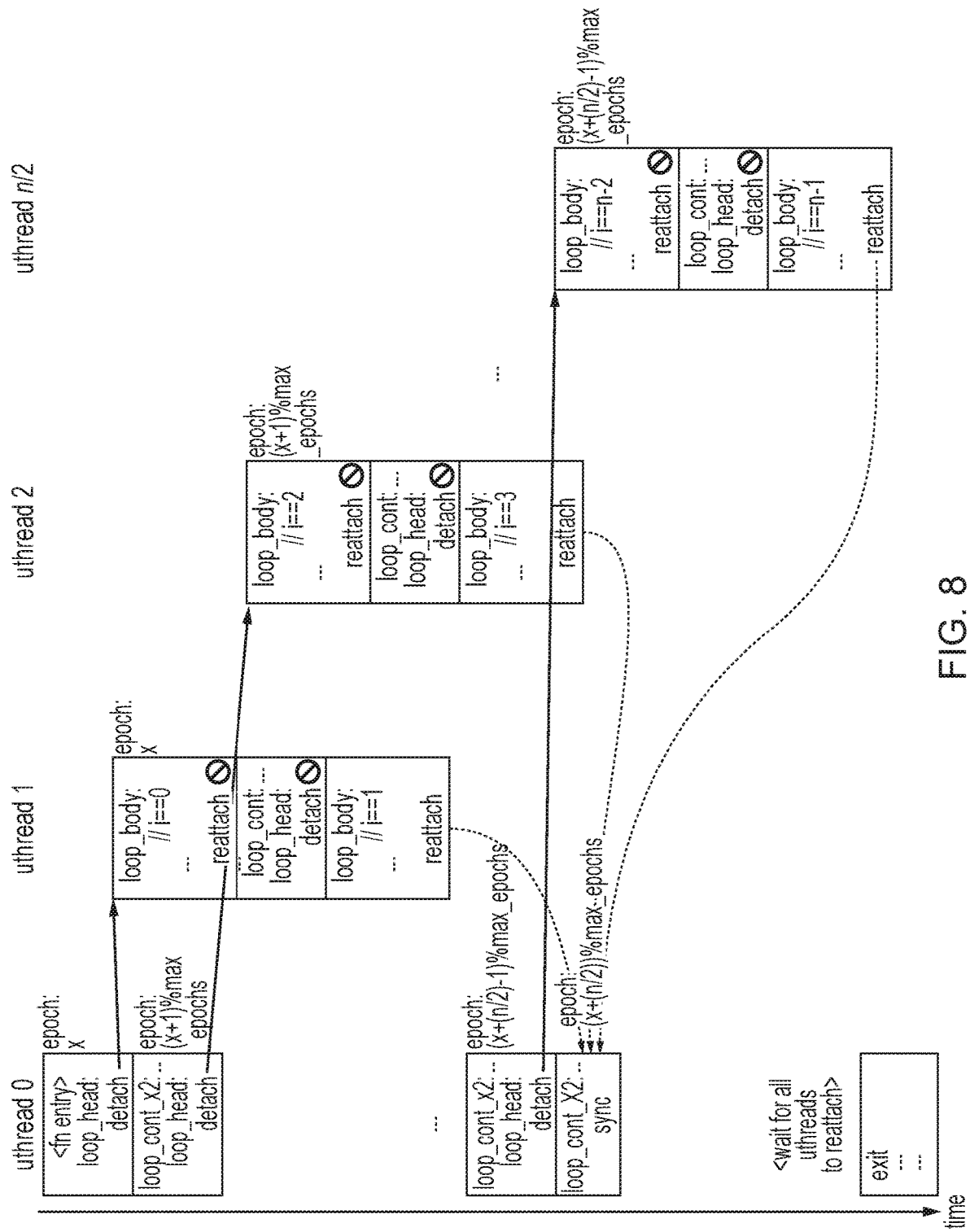
Figure 9:
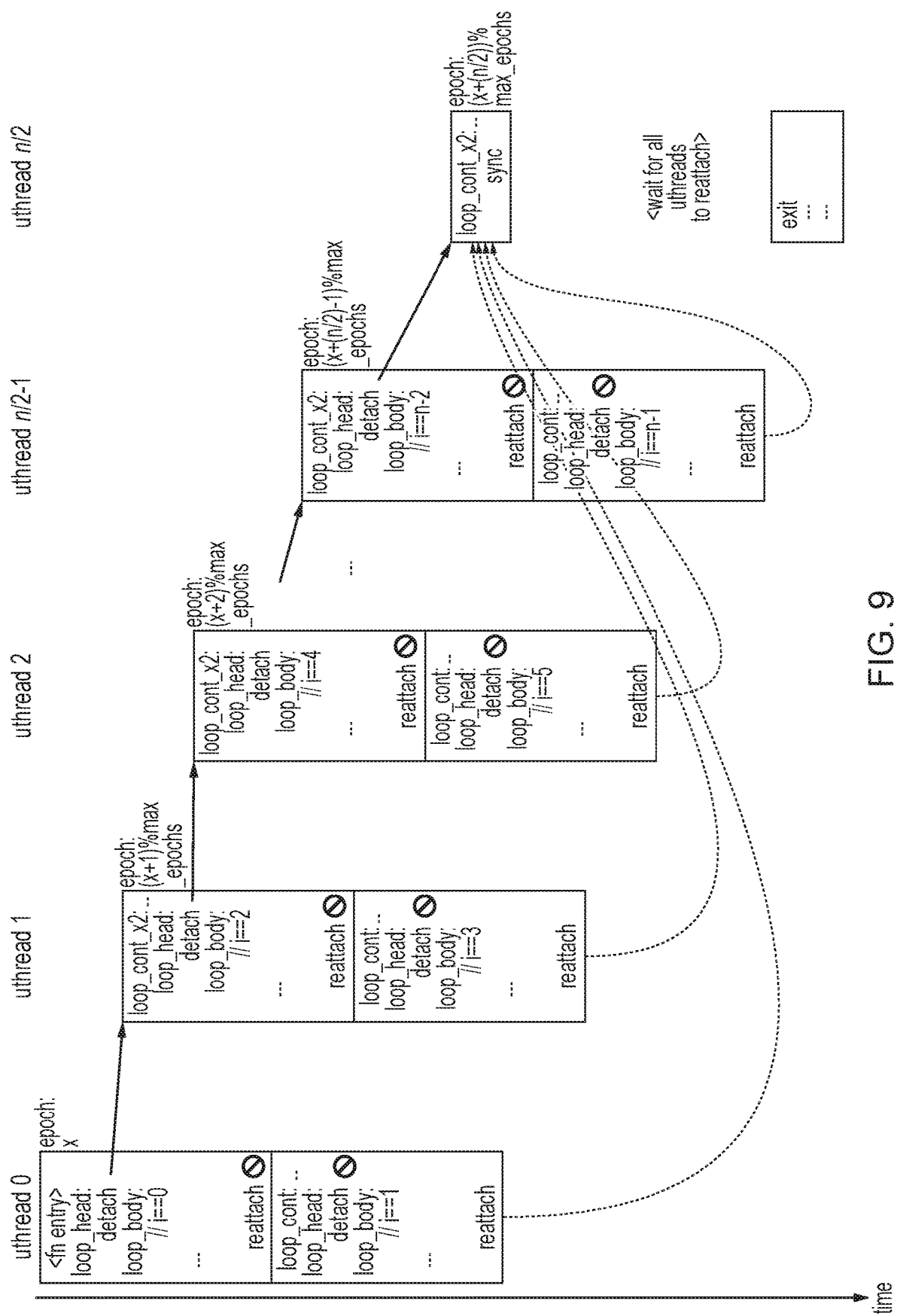
Figure 10:
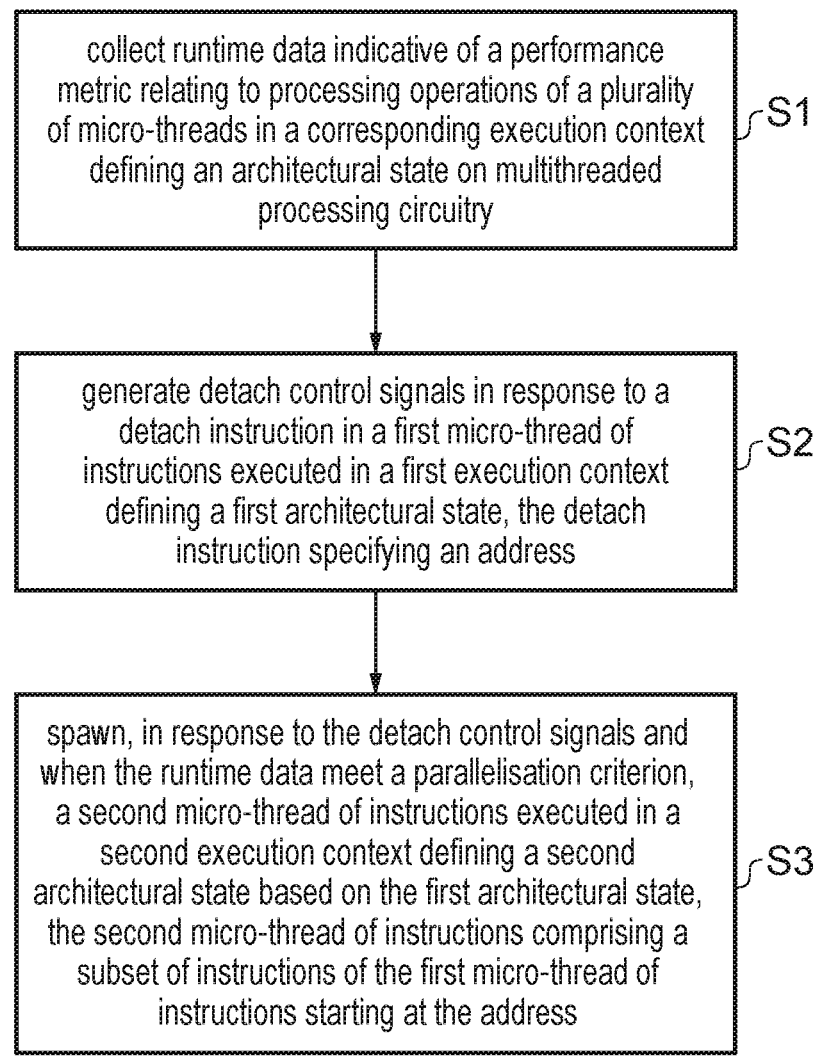

The present techniques will be described further, by way of example only, with reference to embodiments thereof as illustrated in the accompanying drawings, in which:

FIG. 1 schematically illustrates a data processing apparatus which may embody various examples of the present techniques;

FIG. 2 schematically illustrates details of the operation of thread control circuitry which may embody various examples of the present techniques;

FIG. 3A schematically illustrates details of the assignment of epoch identifiers which may embody various examples of the present techniques;

FIG. 3B schematically illustrates details of the assignment of epoch identifiers which may embody various examples of the present techniques;

FIG. 4 schematically illustrates details of micro-thread execution which may embody various examples of the present techniques;

FIG. 5 schematically illustrates details of micro-thread execution which may embody various examples of the present techniques;

FIG. 6 schematically illustrates details of micro-thread execution which may embody various examples of the present techniques;

FIG. 7 schematically illustrates details of micro-thread execution which may embody various examples of the present techniques;

FIG. 8 schematically illustrates details of micro-thread execution which may embody various examples of the present techniques;

FIG. 9 schematically illustrates details of micro-thread execution which may embody various examples of the present techniques; and FIG. 10 schematically shows a sequence of steps that are carried out by some examples of the present invention.

At least some embodiments provide a data processing apparatus comprising: multithreaded processing circuitry to perform processing operations of a plurality of micro-threads, each micro-thread operating in a corresponding execution context defining an architectural state; thread control circuitry to collect runtime data indicative of a performance metric relating to the processing operations; and decoder circuitry responsive to a detach instruction in a first micro-thread of instructions executed in a first execution context defining a first architectural state, the detach instruction specifying an address, to provide detach control signals to the thread control circuitry, wherein when the runtime data meet a parallelization criterion, the thread control circuitry is responsive to the detach control signals to spawn a second micro-thread of instructions executed in a second execution context defining a second architectural state based on the first architectural state, the second micro-thread of instructions comprising a subset of instructions of the first micro-thread of instructions starting at the address.

The thread control circuitry of the multithreaded processing circuitry maintains and controls execution of a plurality of micro-threads each with a corresponding execution context. The execution context defines an architectural state which comprises a number of architectural registers which may be mapped to a corresponding subset of available physical registers, a number of control and status registers and a program counter value indicating a position in a sequence of instructions of a currently executing instruction of the execution context. The multithreaded data processing apparatus may be configured to execute a number of the plurality of micro-threads in parallel on a number of parallel pipelines and may also, or instead, employ time interleaving techniques allowing different micro-threads of the plurality of micro-threads to execute sequentially, for example, when one thread is waiting for data to be fetched a different thread can utilise the resources of the data processing apparatus. The thread control circuitry is further configured to collect runtime data that is indicative of a performance metric relating to the processing operations of the micro-threads. In particular, and as further described below, the performance metric provides an indication of whether the currently executing instructions may benefit from parallelism.

The data processing apparatus further comprises decoder circuitry which may be responsive to a number of hint based instructions for implicit task parallelization. In particular, the decoder circuitry is responsive to a detach instruction which causes the decoder circuitry to generate detach control signals which are passed to the thread control circuitry. The detach instruction is a hint based instruction, which may be inserted by a programmer or a compiler, that indicates to the data processing apparatus that a set of instructions in a first micro-thread of instructions may benefit from parallel execution. The determination as to whether to act on the hint based instructions is performed at runtime by the thread control circuitry based on the detach control signals and the performance indicator. For example, the decode circuitry may decode a detach instruction at a point where the performance metric indicates that there would be no benefit to performing the set of instructions in parallel. In such a situation the thread control circuitry may continue to execute the set of instructions sequentially. On the other hand, if the decode circuitry decodes a detach instruction and the performance metric indicates that the set of instructions would benefit from parallelization, the thread control circuitry may spawn a second micro-thread of instructions which inherits its execution context, at least in part, from the first micro-thread of instructions. The detach instruction further specifies an address of an instruction which is indicative of a starting point for the second micro thread of instructions. In this way the first micro-thread of instructions and the second micro-thread of instructions can be executed in parallel when the performance metric indicates that such parallelization is beneficial to the execution of the instructions that would, without the detach instruction, have been executed entirely in the first micro-thread of instructions.

By relying on a hint based approach the expectation is that the programmer or the compiler can insert low-cost hints around sections of code whose parallelization might provide a benefit. However, it is the job of the microarchitecture to decide at runtime whether parallelization across any particular set of hints is profitable or not. In turn, this eases the burden on the compiler because it doesn't need to perform overly complex analyses for assessing profitability, nor generate fat-binaries containing both parallelized and sequential copies of the same functionality. The programmer or the compiler can opportunistically insert these hints even when having low confidence about profitability of parallelization for a particular region, trusting that the microarchitecture will be able to make a more informed decision at runtime. When the insertion of hint based instructions is left to the compiler this eliminates the need for programmers to re-write their code such that it can benefit from thread level speculation, as the compiler now has a more tractable job. Aggressive compiler analysis or programmer assistance is therefore no longer necessary when inserting parallelization hints.

In at least some embodiments the address is a first address, the subset of instructions is a first subset of instructions, and the detach instruction further comprises a second address, and wherein when the runtime data meet the parallelization criterion, the thread control circuitry is responsive to the detach control signals to cause the first micro-thread of instructions to execute a second subset of instructions starting at the second address. In this way the hint based detach instruction can be used to cause a first subset of instructions and a second subset of instructions to be executed as part of a set of separate micro-threads, each executed in its own execution context. The first subset of instructions is defined by the first address included in the detach instruction and the second subset of instructions is defined by the second address included in the detach instruction. The first and second subsets of instructions could be variously defined. In particular, the first and second subsets of instructions could correspond to different subsets of instructions. For example, if the second subset of instructions occurs sequentially before or after the first set of instructions in the static binary that is generated by a compiler, and the runtime data identifies that these two subsets could be advantageously executed in parallel, the thread control circuitry can spawn a second execution environment, based on the execution environment of the first micro thread, in which to run the second subset of instructions.

In at least some embodiments the first subset of instructions and the second subset of instructions are subsets of the first micro-thread of instructions that are non-overlapping during dynamic execution. Whilst the instructions that are executed by the first micro thread and the second micro thread may correspond to the same instructions in the static binary produced by the compiler, they correspond to non-overlapping instructions during dynamic execution. For example, the first subset of instructions could correspond to a first iteration of a loop defined by a loop index taking a first value and the second subset of instructions could correspond to a second iteration of a loop defined by the loop index taking a second value. In this way the thread control circuitry is able to decide at runtime whether the loop will benefit from parallel execution and, if so, to spawn additional micro threads to take advantage of parallel execution.

In at least some embodiments, when the runtime data does not meet the parallelization criterion, the thread control circuitry is adapted to interpret the detach instruction as one of: an unconditional branch instruction, and a no-operation. When the thread control circuitry interprets the detach instruction as a no-operation, instruction execution moves sequentially to the next instruction. Alternatively, the thread control circuitry may treat the detach instruction as an unconditional branch instruction such that program execution continues sequentially from the branch target. In this way, program execution can be configured to continue as though the detach instruction had not occurred with program execution continuing from the instruction that would have occurred had the detach instruction not been inserted by the compiler or the programmer.

In at least some embodiments the decoder circuitry is responsive to a reattach instruction in a particular micro-thread of instructions, to provide reattach control signals to the thread control circuitry, and wherein the thread control circuitry is responsive to the reattach control signals to terminate the particular micro-thread of instructions. In this way, a block of instructions that may benefit from parallelization by being executed as part of the particular micro-thread of instructions can be demarked by placing the block of instructions between a detach instruction to indicate the point at which the particular micro-thread of instructions may begin and a reattach instruction to indicate the point at which the particular micro-thread of instructions is to finish. The particular micro thread in which the reattach instruction occurs is not limited and can be either of the first micro thread of instructions or the second micro thread of instructions. In the case in which the reattach instruction occurs in the first micro thread execution may continue in the second micro thread of instructions. Alternatively, in the case in which the reattach instruction occurs in the second micro thread execution may continue in the first micro thread of instructions.

In at least some embodiments the thread control circuitry is responsive to occurrence of a data hazard between the particular micro-thread of instructions and another micro-thread of instructions to indicate an unsuccessful termination of the particular micro-thread. As the parallelization is based on the combination of a hint based instruction and an indication from runtime data that parallelization may be beneficial, there is a possibility that unexpected data hazards may occur in one or more threads. In particular, when it has been identified that parallel execution would be beneficial, the particular micro thread is executing speculatively and may terminate successfully upon executing the reattach instruction, this would indicate that no memory hazards have occurred during the execution and the particular micro thread may eventually commit. However, the particular micro thread may not terminate successfully if a potential hazard is detected, for instance a memory dependence violation such as a read after write hazard, or the occurrence of an exception or interrupt event that causes the flushing of the speculative state (and potentially those of other micro threads that are associated with the particular micro thread). In this way hazards that occur during speculative execution of the particular micro thread can be avoided.

In at least some embodiments, the thread control circuitry is responsive to the indication of the unsuccessful termination to re-spawn the particular micro-thread of instructions. The re-spawning of the particular micro-thread may require the re-execution of the detach instruction from a known correct, less-speculative or non-speculative state until it can be determined that the particular micro thread has successfully terminated.

In at least some embodiments, when the runtime data does not meet the parallelization criterion, the thread control circuitry is adapted to interpret the reattach instruction as one of: an unconditional branch instruction, and a no-operation. When the thread control circuitry interprets the reattach instruction as a no-operation, instruction execution moves sequentially to the next instruction. Alternatively, the thread control circuitry may treat the reattach instruction as an unconditional branch instruction such that program execution continues sequentially from the branch target. In this way, program execution can be configured to continue as though the reattach instruction had not occurred with program execution continuing from the instruction that would have occurred had the reattach instruction not been inserted by the compiler or the programmer.

In at least some embodiments, each micro-thread is identified by an epoch identifier. The thread control circuitry has to keep track of the sequential semantics of the original program. Hence, at any given time, the epoch identifier is used to keep track of the total execution order between micro threads. When a new micro thread is spawned a new epoch identifier must be generated. To make the handling of the epoch identifiers practical in some embodiments the epoch identifiers are handled in a circular way. The thread control circuitry will assign epoch identifiers in ascending order as new micro threads are spawned and will wrap around when the largest supported epoch identifier value is reached. This scheme can be efficiently implemented with two counters storing the least recently assigned epoch identifier (assigned to the oldest speculative micro thread) and the most recently assigned epoch identifier (assigned to the youngest speculative micro thread) respectively. This simplification is possible because the states of the micro threads are committed, i.e., merged to the architectural state in order of epoch identifier from the oldest speculative micro-thread to the youngest speculative micro-thread, in order to preserve sequential semantics and the epoch identifiers are therefore released in order.

In at least some embodiments the particular micro-thread of instructions is the first micro-thread of instructions, and wherein in response to the detach instruction the thread control circuitry is adapted to assign a new epoch identifier to the second micro-thread of instructions. In this way, after execution of the detach instruction and when the runtime data meets the parallelization criterion, the first micro thread of instructions retains its current epoch identifier and executes a number of instructions until a reattach instruction is reached. When the first micro thread of instructions has successfully reached the reattach instruction, i.e., without the identification of any hazard or interrupt, the first micro thread of instructions may commit to the architectural state. In addition, on execution of the detach instruction the second micro thread of instructions is spawned and is assigned a new epoch identifier. In some embodiments, the second micro thread of instructions may contain the detach instruction causing the further spawning of a third micro thread using the mechanism described above. In this way, for example, a loop can be parallelized in which a new thread is spawned for each iteration of the loop body. Where there is a small number of loop iterations, this approach may be advantageous as each micro thread may be used for the execution of instructions in the loop body.

In at least some embodiments the particular micro-thread of instructions is the second micro-thread of instructions, and wherein prior to the detach instruction the first micro-thread was assigned a first epoch identifier and, in response to the detach instruction, the thread control circuitry is adapted to assign a new epoch identifier to the first micro-thread of instructions and to assign the first epoch identifier to the second micro-thread of instructions. In this way, after execution of the detach instruction and when the runtime data meets the parallelization criterion, the second micro thread of instructions is spawned and inherits the epoch identifier of the first micro thread of instructions and a new epoch identifier is generated and assigned to the first micro thread of instructions. When the second micro thread of instructions has successfully reached the reattach instruction, i.e., without the identification of any hazard or interrupt, the second micro thread of instructions may commit to the architectural state. In some embodiments, the first micro thread of instructions may contain the detach instruction causing the further spawning of a third micro thread using the mechanism described above. In this way, for example, a loop can be parallelized in which the first micro thread of instructions spawns a separate micro thread of instructions to handle each iteration of the loop. This approach is advantageous as plural micro threads can be rapidly spawned by the first micro thread of instructions without having to wait for any spawning overhead associated with each new thread sequentially spawning a subsequent thread.

In at least some embodiments the detach instruction specifies a region identifier and at least one subsequent reattach instruction specifies the region identifier. In this way the decode circuitry is able to generate control signals which the thread control circuitry can use to identify which reattach-detach instruction pairs correspond to each other. In particular, this enables the programmer or compiler to insert nested hint based reattach-detach pairs which allows the thread control circuitry to preserve sequential semantics of the program.

In at least some embodiments the region identifier is a first region identifier, a subsequent detach instruction specifies a second region identifier and a subsequent reattach instruction specifies the second region identifier, wherein the epoch identifier comprises an outer epoch identifier and an inner epoch identifier, and wherein when the subsequent detach instruction and the subsequent reattach instruction are between the detach instruction and the reattach instruction in program order, the outer epoch identifier is assigned in association with the detach instruction, and the inner epoch identifier is assigned in association with the subsequent detach instruction. By splitting the epoch identifier into an outer epoch identifier associated with an outer reattach and detach instruction, and an inner epoch identifier associated with an inner reattach and detach instruction total program order can be maintained based on the epoch identifiers. It would be readily apparent to the person skilled in the art that the disclosure is not limited to an outer epoch identifier and an inner epoch identifier and that any number of nested epoch identifiers could be defined and assigned to a corresponding number of sets of nested detach and reattach instructions.

In some embodiments the runtime data is first runtime data and the performance metric is a first performance metric associated with the first region identifier, and wherein the thread control circuitry is adapted to collect second runtime data indicative of a second performance metric associated with the second region identifier. In this way the thread control circuitry is able to determine, for a specific region identifier, whether it would be beneficial for the thread control circuitry to spawn new micro threads associated with that region identifier or whether it would be more beneficial to ignore the hint based parallelization instructions associated with that region identifier. For example, it may be that the thread control circuitry determines, based on the first runtime data and the first performance metric, that it is not beneficial to parallelize an outer loop corresponding to an outer set of detach-reattach instructions, yet based on the second runtime data and the second performance metric, the thread control circuitry may determine that it is beneficial to parallelize an inner loop corresponding to an inner set of detach-reattach instructions. Alternatively, it may be determined that it is beneficial to parallelize the outer loop and not the inner loop.

In some embodiments when a number of currently active micro-threads is equal to a maximum number of supported micro-threads, the data processing apparatus is configured to treat the detach instruction as one of: an unconditional branch instruction and a no-operation. This prevents the data processing apparatus from generating micro threads that cannot be supported by the thread control circuitry, the number of physical registers that are available in the data processing apparatus, the available memory bandwidth, or due to execution unit throughput. It would be readily apparent to the skilled person that these are merely examples of situations in which additional micro-threads cannot be supported and that the data processing apparatus may treat the detach instruction as one of: an unconditional branch instruction and a no-operation in response to any limitation of the hardware dependent on the particular embodiment.

In some embodiments the decoder circuitry is responsive to a sync instruction in a micro-thread of instructions with a youngest epoch identifier to pause execution of subsequent instructions in the youngest micro-thread of instructions until all spawned micro-threads with older epoch identifiers and a same region identifier have terminated. The sync instruction is associated with a particular region identifier that is chosen by the programmer or the compiler to match the region identifier of the paired detach-reattach instructions. The role of the sync instruction is to behave as a synchronisation barrier for all the micro threads that have been spawned within the particular parallel region. Once all the spawned micro threads complete execution by issuing a reattach instruction, the micro thread issuing the sync instruction can continue execution as the only executing micro thread associated with the region identifier. The micro thread that issues the sync instruction is the thread with the youngest epoch identifier to be executed in a parallel region. The merging of all spawned micro threads that preserves the originally expected sequential observable semantics requires that all micro threads with older epoch identifiers have successfully terminated and committed to the architectural state in strict epoch identifier order by executing their reattach instructions; and when the sync issuing micro thread becomes the one with the oldest uncommitted speculative state, it may then commit to the architectural state and continue sequential execution beyond the sync instruction. This approach ensures that any operations after the potentially parallel region may continue execution with a same architectural state as if the parallelization hints had been omitted, or treaded as one of a no-operation and an unconditional branch instruction.

In at least some embodiments, when the runtime data does not meet the parallelization criterion, the thread control circuitry is adapted to interpret the sync instruction as a no-operation. In this way, program execution can be configured to continue as though the sync instruction had not occurred with program execution continuing from the instruction that would have occurred had the sync instruction not been inserted by the compiler or the programmer.

In at least some embodiments the decoder circuitry is further responsive to the sync instruction in the micro-thread of instructions with the youngest epoch identifier to pause execution of subsequent instructions in the youngest micro-thread of instructions until all spawned micro threads with older epoch identifiers and a different region identifier have terminated. In this way a sync instruction that behaves as a global sync instruction can be executed to ensure that, at a particular point, all micro threads from all region identifiers are committed such that only one thread may exist subsequent to the execution of the global sync instruction and that the only existing thread is the one which issued the sync instruction.

In at least some embodiments, based on a scheduling factor n, the thread control circuitry is adapted interpret occurrences of the detach instruction and occurrences of the reattach instruction as one of an unconditional branch instruction and a no-operation. The default scheduling policy for parallel tasks assumes that a detach operation, that is not treated as one of a no-operation and an unconditional branch instruction, triggers the creation of a new micro thread. In the case of automatic hint based parallelization of some loops this can be sub-optimal, especially when the loop body comprises a small number of instructions. However, the loop may still benefit from parallelization in cases where intra loop dependencies are rare or absent at runtime.

In at least some embodiments the thread control circuitry is adapted to spawn the second micro-thread of instructions in response to every $n^{th}$ occurrence of the detach instruction and to interpret all other occurrences of the detach instruction as one of the unconditional branch instruction and the no-operation, and wherein the thread control circuitry is adapted to terminate the particular micro-thread of instructions in response to every $(n-1)^{th}$ occurrence of the reattach instruction and to interpret all other occurrences of the reattach instruction as one of the unconditional branch instruction and the no-operation. For example, in the case where n=2, the first occurrence of the detach instruction would cause a new micro thread to be spawned, but the first occurrence of the reattach instruction and the second occurrence of the detach instruction would be treated as one of a no-operation and an unconditional branch operation. In this way each micro thread would run through two occurrences of the parallel region of code reducing the burden of spawning new threads whilst still gaining a parallelization advantage.

In some embodiments the scheduling factor n is based on the runtime data. This mechanism allows the thread control circuitry to tailor the number of times a region of parallel code is executed within each micro thread based on the runtime data. For example, the runtime data may indicate that, based on the overhead of spawning the micro threads, no parallelization advantage can be gained for a value of n less than 3, however, it may also be determined that for larger values of n there may be a greater chance of data hazards occurring. Hence, the thread control circuitry could advantageously choose a value of n of 3 to obtain a parallelization advantage whilst minimising the chance of data hazards occurring.

In at least some embodiments the decoder circuitry is further responsive to the detach instruction specifying an alternative address, and wherein, when n is greater than 1, the thread control circuitry is configured to begin execution in the second execution context from the alternative address. The instructions corresponding to the alternative address can be used to increment an inductive variable by an amount n when n is greater than 1. For example, hint based parallelization instructions could be inserted to enable the thread control circuitry to choose whether to spawn parallel threads with a value of n=1 or n=2. In the case n=1 the second address from which the first micro thread of instructions continues execution could define a loop continuation block in which an inductive variable associated with the loop is increased by 1. Additionally, the alternative address can be used for the case in which n=2 to define an alternative continuation block in which the inductive variable associated with the loop is increased by 2. It would be readily apparent to the person skilled in the art that the choices of n=1 and n=2 are for illustrative purposes and any values of n could be chosen.

In at least some embodiments the decoder circuitry is further responsive to the detach instruction specifying an alternative address, and wherein, when n is greater than 1, the thread control circuitry is configured to cause the first micro-thread of instructions to continue execution from the alternative address. The instructions corresponding to the alternative address can be used to increment an inductive variable by an amount n when n is greater than 1. For example, hint based parallelization instructions could be inserted to enable the thread control circuitry to choose whether to spawn parallel threads with a value of n=1 or n=2. In the case n=1 thread control circuitry could spawn a second thread and the address could define a loop continuation block in which an inductive variable associated with the loop is increased by 1. Additionally, the alternative address can be used for the case in which n=2 to define an alternative continuation block in which the inductive variable associated with the loop is increased by 2. It would be readily apparent to the person skilled in the art that the choices of n=1 and n=2 are for illustrative purposes and any values of n could be chosen.

In at least some embodiments the decoder circuitry is further responsive to the detach instruction specifying additional metadata comprising at least one of: a parallelization confidence level representing a likelihood of dynamic dependencies between micro-threads occurring at runtime; a parallelization worthiness level providing an estimated number of instructions included the second micro-thread of instructions; and an indication of a type of dynamic dependencies expected to occur between micro-threads at runtime. The additional metadata can be specified by the programmer or compiler based on, for example, profiling data and/or estimated use cases. The additional metadata specified can be interpreted by the thread control circuitry in combination with the runtime data to determine when it is most appropriate to speculatively spawn additional micro threads. For example, when the programmer or compiler indicates a high parallelization confidence level or a high parallelization worthiness level, the thread control circuitry may require a lower threshold to be met by the runtime data prior to spawning additional micro threads. Alternatively, when the programmer or compiler indicates a low parallelization confidence level or a low parallelisation worthiness level, the thread control circuitry may require a higher threshold to be met by the runtime data prior to spawning additional micro threads.

In at least some embodiments the performance metric comprises at least one of: an average number of instructions executed per cycle; an average occupancy of resources in the multithreaded processing circuitry; a number of memory read after write conflicts detected; and a number of instructions executed per micro-thread of instructions. In this way the thread control circuitry can determine at runtime whether, for a particular set of instructions, it is likely to be beneficial to execute the instructions in parallel or, alternatively, whether there are insufficient resources to execute the instructions in parallel, the likelihood of a data hazard occurring is too high, or the overhead associated with parallelization of a particular set of instructions may be too high for any benefit to be observed. In at least some embodiments, the runtime data is constantly updated and, as a result, it may be determined that a currently parallel set of micro threads is providing little or no advantage. At this point the thread control circuitry may determine that it is better to cease parallel execution or to modify a number of detach and reattach pairs that treated as one of a no-operation or an unconditional branch instruction in order to improve the performance of the data processing apparatus.

In at least some embodiments the data processing apparatus comprises a set of physical registers; and register rename circuitry to map a set of architectural registers to a subset of the set of physical registers, wherein the register rename circuitry maps a first set of architectural registers to a first set of physical registers associated with the first execution context, and the register rename circuitry maps a second set of architectural registers to a second set of physical registers associated with the second execution context. In this way a complete set of architectural registers can be maintained for each of the execution contexts associated with a currently executing set of micro threads.

In at least some embodiments a first subset of the first set of physical registers and a first subset of the second set of physical registers are a same set of registers, and wherein a second subset of the first set of physical registers and a second subset of the second set of physical registers are a different set of registers. In this way, where it is beneficial to do so, the thread control circuitry can cause a number of execution contexts to share a first subset of the physical registers and maintain a second subset of physical registers that are unique to each execution context. In other words, architectural state of each execution context can be defined by a number of shared registers in addition to a number of registers unique to each execution context. In cases where it is unlikely that data will be modified during parallel execution of the micro threads, it is beneficial to only maintain one copy of the physical register in which that data is stored. This increases the number of physical registers that are available for different execution contexts and, hence, a total number of supported execution contexts can be increased.

In at least some embodiments there is a data processing method comprising: collecting runtime data indicative of a performance metric relating to processing operations of a plurality of micro-threads in a corresponding execution context defining an architectural state on multithreaded processing circuitry; generating detach control signals in response to a detach instruction in a first micro-thread of instructions executed in a first execution context defining a first architectural state, the detach instruction specifying an address; and spawning, in response to the detach control signals and when the runtime data meet a parallelization criterion, a second micro-thread of instructions executed in a second execution context defining a second architectural state based on the first architectural state, the second micro-thread of instructions comprising a subset of instructions of the first micro-thread of instructions starting at the address.

In at least some embodiments there is a data processing apparatus comprising: means for collecting runtime data indicative of a performance metric relating to processing operations of a plurality of micro-threads in a corresponding execution context defining an architectural state on multithreaded processing circuitry; means for generating detach control signals in response to a detach instruction in a first micro-thread of instructions executed in a first execution context defining a first architectural state, the detach instruction specifying an address; and means for spawning, in response to the detach control signals and when the runtime data meet a parallelization criterion, a second micro-thread of instructions executed in a second execution context defining a second architectural state based on the first architectural state, the second micro-thread of instructions comprising a subset of instructions of the first micro-thread of instructions starting at the address.

Some particular embodiments are now described with reference to the figures.

FIG. 1 schematically illustrates a data processing apparatus which may embody various examples of the present techniques. The data processing apparatus 10 comprises multithreaded processing circuitry 12 and thread control circuitry 14. The thread control circuitry 14 is adapted to support a plurality of micro thread contexts 16. The multithreaded processing circuitry 12 is a set of multithreaded execution resources and comprises a plurality of execution pipelines 18, a set of physical registers 20, an instruction cache 22, a level 1 data cache 26 and a level 2 cache 24. Each of the plurality of execution pipelines comprises fetch circuitry 28 to fetch instructions from the instruction cache 22. The fetched instructions are passed to decode circuitry 30, which generates control signals for the other components of the multithreaded processing circuitry including the thread control circuitry 14 and to rename circuitry 32. The rename circuitry 32 maps a number of physical registers 20 to a corresponding set of architectural registers associated with the execution context that is executing on the pipeline 18 before passing the decoded instructions to issue circuitry 43 for issuing to the execute circuitry 36, which may contain any number of execution stages including, but not limited to, arithmetic logic units, floating point units and load/store units. Once the instructions have completed execution they are passed to writeback circuitry 40. It would be readily apparent to the person skilled in the art that the pipeline of components 28, 30, 32, 34, 36, and 40 is intended to be illustrative of a typical multithreaded data processing apparatus and that any pipeline components may be dedicated components provided for each pipeline or may be shared amongst any number of the plurality of pipelines 18. For example, each pipeline 18 may have some dedicated pipeline components and some components that are shared with one or more other pipelines 18. However, additional structures not explicitly shown may be added to the data processing apparatus 10. It would be readily apparent to the person skilled in the art that multithreaded processing circuitry 12 may also include a single pipeline 18 that interleaves its resources across the plurality of micro-thread contexts.

FIG. 2 schematically illustrates details of the operation of thread control circuitry which may embody various examples of the present techniques. In some embodiments this thread control circuitry 42 may provide the thread control circuitry 14 of FIG. 1. The thread control circuitry 42 stores a number of counters that are used to control and keep track of the different micro threads executing on the data processing apparatus. In particular, the thread control circuitry uses epoch counters 44 to track, for each region identifier corresponding to a set of currently executing code denoted by a detach-reattach pair of instructions, the oldest epoch identifier issued to a micro thread with that region identifier and the youngest epoch identifier issued to a micro thread with that region identifier. In this way, and as will be further described in relation to FIG. 3A, the in-flight epoch identifiers can be maintained for each region identifier. In addition, the thread control circuitry 42 may maintain an execution context table 46 indicative of each execution context that is currently maintained by the multithreaded processing apparatus, the corresponding epoch identifier and the corresponding region identifier. It would be readily apparent to the person skilled in the art that the information illustrated as maintained in the execution context table 46 is not exhaustive and any information associated with the execution context may also be stored therein. For example, the execution context table 46 may maintain a mapping between the physical registers and architectural registers assigned to each execution context. In addition, the thread control circuitry maintains runtime data 48 based on indicative of a performance metric relating to the processing operations. Runtime data may be continually updated based on the currently executing instructions and/or may be maintained independently for each region identifier. In this way the thread control circuitry can control and maintain whether, for each region identifier, additional micro threads are to be spawned and, if micro threads are to be spawned, which epoch identifiers are associated with which execution context and which region identifier.

FIGS. 3A and 3B schematically illustrates details of the assignment of epoch identifiers which may embody various examples of the present techniques. Starting with FIG. 3A, the epoch identifiers 50 are handled in a circular way. The thread control circuitry assigns epoch identifiers in ascending order as new micro threads are spawned and wraps around when the largest supported epoch identifier is reached. This scheme is implemented using two counters which keep track of the oldest epoch identifier 52 and the youngest epoch identifier 54. When a new epoch identifier is assigned the youngest epoch identifier is incremented, wrapping around to zero once the oldest epoch identifier has been assigned. When a micro thread is committed, which occurs in-order, the oldest epoch identifier is incremented thereby freeing the epoch identifier to be used by a subsequent micro thread. As illustrated in FIG. 2, a youngest epoch counter 54 and an oldest epoch counter 52 are maintained for each region identifier.

As illustrated in FIG. 3B, for embodiments in which nested parallelisation regions are supported, the epoch identifier 56 associated with each micro thread may be defined hierarchically. In the illustrated embodiment the epoch identifier 56 is defined by an outermost identifier 58 associated with outermost pair of detach-reattach instructions, an outer identifier 60 defined by an outer pair of detach-reattach instructions nested within the outermost pair of detach-reattach instructions, an inner identifier 62 associated with an inner pair of detach-reattach instructions nested within the outer pair of detach-reattach instructions, and an innermost identifier associated with an innermost pair of detach-reattach instructions nested within the inner pair of reattach detach instructions. It would be readily apparent to the person skilled in the art that the definition of four layers of epoch identifiers associated with the nested pairs of detach-reattach instructions is for illustrative purpose only and that any number of sets of nested pairs of detach-reattach instructions could be supported based on the described mechanism. In some embodiments the bit-width assigned to each of the layers of epoch identifiers may be varied dynamically by the hardware at runtime, whilst in other embodiments the bit-width assigned to each of the layers of epoch identifiers may be statically determined. Similarly to the example discussed in relation to FIG. 3A, each of the outermost identifier 58, the outer identifier 60, the inner identifier 62 and the innermost identifier 64 requires the maintenance of a pair of counters associated with the oldest epoch identifier and the youngest epoch identifier. In particular, the outermost epoch identifier 58 is one of a set of available outermost identifiers 66 and is associated with an oldest outermost identifier 68 and a youngest outermost identifier 70. Similarly, assignment of each of the outer identifier 60, the inner identifier 62, and the innermost identifier 64 is maintained through a corresponding outer oldest identifier and an outer youngest identifier, an inner oldest identifier and an inner youngest identifier, and an innermost oldest identifier 74 and an innermost youngest identifier 76.

FIGS. 4 to 7 schematically illustrates details of examples of micro-thread execution which may embody various examples of the present techniques. In particular, these figures are based on the following example C code with the corresponding optimized assembly code;

```
// C code
    void sum_arrays(int *restrict res, const int *restrict a,const
int *restrict b,size_t n) {
        for (size_t i = 0; i < n; ++i)
        res[i] = a[i] + b[i];
    }
// Optimized assembly code
    .text
    .globl           sum_arrays
sum_arrays:
    cbz              x3, exit
    mov              x10, xzr
loop_head:
    ldr              w8, [x1, x10, lsl #2]
    ldr              w9, [x2, x10, lsl #2]
    add              x10, x10, #1
    add              w8, w9, w8
    str              w8, [x0, x10, lsl #2]
    cmp              x10, x3
    b.ne             loop_head
exit:
    ret
```

In the illustrated examples the following modifications are made by the compiler to the assembly code in order to exploit the task level parallelization set out in some embodiments of the present invention.

```
// Modified assembly code with detach/reattach/sync
instructions
    .text
    .globl           sum_arrays
sum_arrays:
    cbz              x3, exit
    mov              x10, xzr
loop_head:
    detach           loop_body, loop_cont, <region_id>, <metadata>
loop_body:
    ldr              w8, [x1, x10, lsl #2]
    ldr              w9, [x2, x10, lsl #2]
    add              w8, w9, w8
    str              w8, [x0, x10, lsl #2]
    reattach loop_cont, <region_id>
loop_cont:
    add              x10, x10, #1       // moved to continuation block
    cmp              x10, x3
    b.ne             loop_head
    sync             <region_id>
exit:
    ret
```

The detach instruction used in the above modified assembly code comprises a number of inputs. The loop_body and loop_cont fields are the addresses of the detach and continuation blocks of instructions respectively. This can be encoded using program counter based offsets for representing such addresses. The detach block field can be omitted if it corresponds to the instruction following the detach instruction in program order. The region_id field is the region identifier which must be unique at runtime and associated with the particular annotated region. In practice it is sufficient for the region identifier to be unique only within a region nest, meaning that the same region identifier could be reused across different nests. The metadata field may capture extra information that can be passed to the thread control circuitry. In particular, the metadata could be used to: encode a parallelization confidence level, representing the likelihood of dynamic dependencies materializing at runtime, e.g. based on profiling data; encoding a parallelization worthiness level, e.g. by including additional information about the estimate length of the parallel paths, expressed in a number of instructions, which could include both a best case and a worst case instruction count; and other information relating to the types of expected dependencies in the region such as the presence or absence of read after write hazards. Similarly, the reattach instruction specifies the loop_cont address and the region identifier, and the sync instruction specifies the region identifier.

FIG. 4 schematically illustrates details of an example of micro-thread execution which may embody various examples of the present techniques. In particular, the thread executing the detach instruction (uthread 0 in this case) continues execution starting from the continuation path (loop_cont) with a newly allocated epoch identifier to reflect the fact that, in the original serial program, the continuation path would have been executed after the detach path (loop body) in program order. The spawned micro thread (uthread 1) starts execution from the detach path (loop_body) with an epoch identifier that is inherited from the parent micro thread. In this example embodiment uthread 0 executes the instructions after loop_cont, first incrementing the value stored in x10 by 1, comparing the value in x10 to x3 and updating the condition flags based on the result before branching to loop_head and re-executing the detach instruction. This causes a new micro thread uthread 2 to be spawned and to continue from loop_body with an updated value in the register x10 imported into the execution context associated with uthread 2 from the execution context associated with uthread 0. As illustrated the spawning of microthreads by uthread 0 continues until the conditional flags associated with the b.ne instruction indicate that the zero flag is set, i.e., the value held in the register x10 is equal to x3. At this point the sync instruction is issued and execution of uthread 0 is paused until the micro threads with the older epoch identifiers are all complete, i.e., they have successfully executed the reattach instruction.

FIG. 5 schematically illustrates details of an example of micro-thread execution which may embody various alternative examples of the present techniques. In particular, the thread executing the detach instruction (uthread 0, initially) continues execution from loop_body without changing its epoch identifier. The spawned micro thread (uthread 1, initially) begins execution from loop_cont with a newly allocated epoch identifier to reflect the fact that, in the original serial program, the continuation path would have been executed after the detach path in program order. In this case uthread 0 continues (assuming successful execution with no data hazards) until it reaches the reattach instruction and uthread 1 begins at the continuation address, increments the value stored in the register x10 by 1, compares the value stored in x10 to that in x3 and updates the condition flags based on the result before branching to loop_head. Execution of uthread 1 continues from loop_head with the issuing of the detach instruction which spawns micro thread uthread 2 before execution of uthread 1 continues from loop_body (assuming successful execution with no data hazards) until it reaches the reattach instruction. As illustrated the spawning of a new micro thread by each previous micro thread continues until the conditional flags associated with the b.ne instruction indicate that the zero flag is set, i.e., the value held in the register x10 is equal to x3. At this point execution of the micro thread that issues the sync instruction (in this case uthread n) is paused until the micro threads with the older epoch identifiers are all complete, i.e., they have successfully executed the reattach instruction.

FIG. 6 schematically illustrates details of an example of micro-thread execution which may embody various examples of the present techniques. In the illustrated example the spawning of micro threads follows the scheme set out in FIG. 4 with the additional feature that a scheduling factor n>1 has been set. As a result the micro threads have to serially elide certain occurrences of the detach and reattach instructions by treating them as one of a no-operation and an unconditional branch instruction. In particular, if the detach-reattach instructions are indexed within a micro thread starting from i–0 and ascending in program order, the $i^{th}$ detach should be serially elided if (i % n)≠0, and the micro thread issuing the detach is the parent thread of all the spawned threads (uthread 0 in this example), where here the notation i % n refers to i modulo n. For the other spawned micro threads, all detach instructions have to be serially elided, because with this variant, only the parent micro thread is able to spawn new micro threads. In addition, the $i^{th}$ reattach instruction should be serially elided only if (i % n)≠n–1. In particular, in this embodiment the scheduling factor is set to n=2. As a result, uthread 0 spawns a new micro thread for odd-numbered occurrences of the detach instruction and serially elides the even-numbered occurrences of the detach instruction. In addition, uthread 0 will increment the loop index i twice between each detach instruction that is not serially elided. The spawned micro threads each run through two iterations of the loop body incrementing the loop index i each time the loop_cont block of instructions is executed. As a result, uthread 0 spawns uthread 1 with index 1=0, and uthread 0 then increments the loop index before serially eliding the second occurrence of the detach instruction. The loop index is incremented again by uthread 0 before the third detach instruction is encountered and uthread 2 is spawned with loop index 1=2 where, as described in relation to FIG. 4, this process continues until uthread 0 encounters the sync instruction.

FIG. 7 schematically illustrates details of an example of micro-thread execution which may embody various examples of the present techniques. In cases where the number of iterations of the loop is not an integer multiple of the scheduling factor then the parent micro thread (uthread 0 in the illustrated example) and the last spawned micro thread will potentially both execute a sync instruction. This scenario is handled through the introduction of a rule stating that a sync deletes or squashes micro threads with epoch identifiers younger than the epoch identifier of the micro thread issuing the sync instruction itself. In the illustrated example, micro thread uthread n/2 reaches the execution of sync with epoch identifier (x+(n/2)−1)% max_epochs where x is the initial epoch identifier of uthread 0 and max_epochs is the highest defined epoch identifier. The epoch identifier of micro thread uthread 0 is (x+(n/2))% max_epochs when it reaches the sync instruction. In this example, the epoch identifier of micro thread uthread 0 is younger than the epoch identifier of micro thread uthread n/2 and is squashed as a result and sequential execution will continue at the end of the parallel section from the execution context of micro thread uthread n/2.

FIGS. 8 and 9 schematically illustrate details of examples of micro-thread execution which may embody various examples of the present techniques. In particular, these figures are based on the same example C code corresponding to FIGS. 4-7 with the following modifications made by the compiler to the assembly code in order to exploit the task level parallelization with scheduling factor n>1 set out in some embodiments of the present invention:

```
       .text
       .globl    sum_arrays
sum_arrays:
       cbz       x3, exit
       mov       x10, xzr
loop_head:
       detach    loop_body, loop_cont, loop_cont_x2, <region_id>,
<metadata>
loop_body:
       ldr       w8, [x1, x10, lsl #2]
       ldr       w9, [x2, x10, lsl #2]
       add       w8, w9, w8
       str       w8, [x0, x10, lsl #2]
       reattach loop_cont, <region_id>
loop_cont:
       add       x10, x10, #1
       cmp       x10, x3
       b.ne      loop_head
sync:
       sync      <region_id>
exit:
       ret
loop_cont_x2:
       add       x10, x10, #2
       cmp       x10, x3
       b.lt      loop_head
       b         sync
```

It is common for loops to have relatively simple continuation paths, with the code mainly dealing with incrementing and decrementing induction variables. Hence, a spawning rate of threads is likely to be relatively high and further optimisation can be leveraged by providing an alternative version of the continuation block starting at the alternative continuation path (loop_cont_x2) that would enable faster spawning rates by incrementing the induction variables once to cover multiple loop iterations. In the example code set out above, a scheduling factor of n=2 has been used, however the person skilled in the art would recognise that this has been chosen for illustrative purpose only and that any integer greater than 1 could be used.

FIG. 8 schematically illustrates details of an example of micro-thread execution which may embody various examples of the present techniques based on the above example assembly code. In the illustrated embodiment execution proceeds as described in relation to FIG. 7, with the notable exception that micro thread uthread 0 jumps to the alternative continuation address (loop_cont_x2) when the detach instruction is executed. The alternative continuation block, starting at the alternative continuation address, increments the value of the loop index in the register x10 by 2. The value in x10 is then checked against x3 to set the conditional flags. When the value in x10 is less than x3 the b.lt (branch if less than) instruction causes the flow to jump to loop_head, otherwise the flow proceeds to jump to the sync instruction. In these illustrated embodiments there is no need for micro thread uthread 0 to decrement the loop index twice. Instead, it is decremented once by a value of 2 in the alternative continuation block.

FIG. 9 schematically illustrates details of an example of micro-thread execution which may embody various examples of the present techniques based on the above example assembly code. In particular, the thread executing the detach instruction (uthread 0 initially) continues execution from loop_body without changing its epoch identifier. The spawned micro thread (uthread 1 initially) begins execution from the alternative continuation path (loop_cont_x2) with a newly allocated epoch identifier to reflect the fact that, in the original serial program, the alternative continuation path would have been executed after the detach path in program order. In the illustrated example the scheduling factor has been set to n=2. As a result the micro threads have to serially elide certain occurrences of the detach and reattach instructions by treating them as one of a no-operation and an unconditional branch instruction. In particular, if we index the detach-reattach instruction within a micro thread starting from l=0 and ascending in program order, the $i^{th}$ detach should be serially elided if (i % n)≠0. the $i^{th}$ reattach instruction should be serially elided only if (i n)≠n−1. As a result, uthread 0 spawns uthread 1 with index i=0 which is immediately incremented in the alternative continuation block to l=2 before returning to loop_head where the detach instruction is executed causing micro thread uthread 2 to be spawned with index l=2. Once the initial detach instruction has been executed by a micro thread (using micro thread uthread 0 as an example) the loop body is executed with index l=0 before the first occurrence of the reattach instruction is serially elided and flow jumps to the continuation block (loop_cont) in which the loop index is incremented again (i=1). Flow then moves to the loop head in which the detach instruction is serially elided and the loop body is executed before the second reattach instruction is encountered and uthread 0 completes. The detach instruction following the alternative continuation block (loop_cont_x2) is never serially elided as the scheduling factor n is hard wired into this version by the compiler. This process continues until the conditional flags associated with the branch less than instruction (b.lt) in the alternative continuation block indicates that the value in register x10 is greater than or equal to x3 when flow branches to the sync instruction at which point execution of the micro thread issuing the sync instruction (in this case uthread n/2) is paused until the micro threads with the older epoch identifiers are all complete, i.e., they have successfully executed the reattach instruction FIG. 10 schematically shows a sequence of steps that are carried out by some examples of the present invention. In step S1, runtime data indicative of a performance metric relating to processing operations of a plurality of micro-threads in a corresponding execution context defining an architectural state on multithreaded processing circuitry is collected. In step S2 detach control signals in response to a detach instruction in a first micro-thread of instructions executed in a first execution context defining a first architectural state are generated, the detach instruction specifying an address. In step S3, in response to the detach control signals and when the runtime data meets a parallelization criterion, a second micro-thread of instructions executed in a second execution context defining a second architectural state based on the first architectural state is spawned, the second micro-thread of instructions comprising a subset of instructions of the first micro-thread of instructions starting at the address. It would be readily apparent to the person skilled in the art that the parallelization criterion could be an indication that it is beneficial to spawn additional micro-threads, or alternatively, that the parallelization criterion could be the lack of an indication that it is not worth spawning additional micro-threads.

In brief overall summary a data processing apparatus and a method for processing data are disclosed. The data processing apparatus comprises: multithreaded processing circuitry to perform processing operations of a plurality of micro-threads, each micro-thread operating in a corresponding execution context defining an architectural state. Thread control circuitry collects runtime data indicative of a performance metric relating to the processing operations. Decoder circuitry is responsive to a detach instruction in a first micro-thread of instructions executed in a first execution context defining a first architectural state, the detach instruction specifying an address, to provide detach control signals to the thread control circuitry. When the runtime data meet a parallelization criterion, the thread control circuitry is responsive to the detach control signals to spawn a second micro-thread of instructions executed in a second execution context defining a second architectural state based on the first architectural state, the second micro-thread of instructions comprising a subset of instructions of the first micro-thread of instructions starting at the address.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
    multithreaded processing circuitry to perform processing operations of a plurality of micro-threads, each micro-thread operating in a corresponding execution context defining an architectural state;
    thread control circuitry to collect runtime data indicative of a performance metric relating to the processing operations; and
    decoder circuitry responsive to a detach instruction in a first micro-thread of instructions executed in a first execution context defining a first architectural state, the detach instruction specifying an address, when the runtime data meet a parallelization criterion at a point where the detach instruction is decoded, to provide detach control signals to the thread control circuitry,
    wherein the thread control circuitry is responsive to the detach control signals to spawn a second micro-thread of instructions executed in a second execution context defining a second architectural state based on the first architectural state, the second micro-thread of instructions comprising a subset of instructions of the first micro-thread of instructions starting at the address.

2. The data processing apparatus of claim 1, wherein the address is a first address, the subset of instructions is a first subset of instructions, and the detach instruction further comprises a second address, and
    wherein when the runtime data meet the parallelization criterion, the thread control circuitry is responsive to the detach control signals to cause the first micro-thread of instructions to execute a second subset of instructions starting at the second address.

3. The data processing apparatus of claim 2, wherein the first subset of instructions and the second subset of instructions are subsets of the first micro-thread of instructions that are non-overlapping during dynamic execution.

4. The data processing apparatus of claim 1, wherein when the runtime data does not meet the parallelization criterion, the thread control circuitry is adapted to interpret the detach instruction as one of: an unconditional branch instruction, and a no-operation.

5. The data processing apparatus of claim 1, wherein the decoder circuitry is responsive to a reattach instruction in a particular micro-thread of instructions, to provide reattach control signals to the thread control circuitry, and
    wherein the thread control circuitry is responsive to the reattach control signals to terminate the particular micro-thread of instructions.

6. The data processing apparatus of claim 5, wherein the thread control circuitry is responsive to occurrence of a data hazard between the particular micro-thread of instructions and another micro-thread of instructions to indicate an unsuccessful termination of the particular micro-thread; and
    the thread control circuitry is responsive to the indication of the unsuccessful termination to re-spawn the particular micro-thread of instructions.

7. The data processing apparatus of claim 5, wherein when the runtime data does not meet the parallelization criterion, the thread control circuitry is adapted to interpret the reattach instruction as one of: an unconditional branch instruction, and a no-operation.

8. The data processing apparatus of claim 5, wherein each micro-thread is identified by an epoch identifier.

9. The data processing apparatus of claim 5, wherein the particular micro-thread of instructions is the first micro-thread of instructions, and
    wherein in response to the detach instruction the thread control circuitry is adapted to assign a new epoch identifier to the second micro-thread of instructions.

10. The data processing apparatus of claim 5, wherein the particular micro-thread of instructions is the second micro-thread of instructions, and
    wherein prior to the detach instruction the first micro-thread was assigned a first epoch identifier and, in response to the detach instruction, the thread control circuitry is adapted to assign a new epoch identifier to the first micro-thread of instructions and to assign the first epoch identifier to the second micro-thread of instructions.

11. The data processing apparatus of claim 5, wherein the detach instruction specifies a region identifier and at least one subsequent reattach instruction specifies the region identifier.

12. The data processing apparatus of claim 11, wherein the region identifier is a first region identifier, a subsequent detach instruction specifies a second region identifier and a subsequent reattach instruction specifies the second region identifier,
    wherein the epoch identifier comprises an outer epoch identifier and an inner epoch identifier, and
    wherein when the subsequent detach instruction and the subsequent reattach instruction are between the detach instruction and the reattach instruction in program order, the outer epoch identifier is assigned in association with the detach instruction, and the inner epoch identifier is assigned in association with the subsequent detach instruction.

13. The data processing apparatus of claim 12, wherein the runtime data is first runtime data and the performance metric is a first performance metric associated with the first region identifier, and
wherein the thread control circuitry is adapted to collect second runtime data indicative of a second performance metric associated with the second region identifier.

14. The data processing apparatus of claim 11, wherein the decoder circuitry is responsive to a sync instruction in a micro-thread of instructions with a youngest epoch identifier to pause execution of subsequent instructions in the youngest micro-thread of instructions until all spawned micro-threads with older epoch identifiers and a same region identifier have terminated.

15. The data processing apparatus of claim 14, wherein the decoder circuitry is further responsive to the sync instruction in the micro-thread of instructions with the youngest epoch identifier to pause execution of subsequent instructions in the youngest micro-thread of instructions until all spawned micro threads with older epoch identifiers and a different region identifier have terminated.

16. The data processing apparatus of claim 5, wherein, based on a scheduling factor n, the thread control circuitry is adapted to interpret occurrences of the detach instruction and occurrences of the reattach instruction as one of an unconditional branch instruction and a no-operation.

17. The data processing apparatus of claim 16, wherein the thread control circuitry is adapted to spawn the second micro-thread of instructions in response to every $n^{th}$ occurrence of the detach instruction and to interpret all other occurrences of the detach instruction as one of the unconditional branch instruction and the no-operation, and
wherein the thread control circuitry is adapted to terminate the particular micro-thread of instructions in response to every $(n-1)^{th}$ occurrence of the reattach instruction and to interpret all other occurrences of the reattach instruction as one of the unconditional branch instruction and the no-operation.

18. The data processing apparatus of claim 16, wherein the scheduling factor n is based on the runtime data.

19. The data processing apparatus of claim 14, wherein the decoder circuitry is further responsive to the detach instruction specifying an alternative address, and wherein, when n is greater than 1, the thread control circuitry is configured to:
begin execution in the second execution context from the alternative address; or
cause the first micro-thread of instructions to continue execution from the alternative address.

20. A data processing method comprising:
collecting runtime data indicative of a performance metric relating to processing operations of a plurality of micro-threads in a corresponding execution context defining an architectural state on multithreaded processing circuitry;
generating, when the runtime data meet a parallelization criterion at a point where the detach instruction is decoded, detach control signals in response to a detach instruction in a first micro-thread of instructions executed in a first execution context defining a first architectural state, the detach instruction specifying an address; and
spawning, in response to the detach control signals, a second micro-thread of instructions executed in a second execution context defining a second architectural state based on the first architectural state, the second micro-thread of instructions comprising a subset of instructions of the first micro-thread of instructions starting at the address.

* * * * *